United States Patent
Gudan et al.

(10) Patent No.: US 10,298,071 B2
(45) Date of Patent: May 21, 2019

(54) DC-DC BOOST CONVERTER

(71) Applicants: Kenneth Gudan, Menlo Park, CA (US); Jonathan J. Hull, Menlo Park, CA (US); Matthew S. Reynolds, Menlo Park, CA (US); Joshua Ensworth, Menlo Park, CA (US)

(72) Inventors: Kenneth Gudan, Menlo Park, CA (US); Jonathan J. Hull, Menlo Park, CA (US); Matthew S. Reynolds, Menlo Park, CA (US); Joshua Ensworth, Menlo Park, CA (US)

(73) Assignee: RICOH CO., LTD, Tokyo (JP)

( * ) Notice: Subject to any disclaimer, the term of this patent is extended or adjusted under 35 U.S.C. 154(b) by 683 days.

(21) Appl. No.: 14/576,043

(22) Filed: Dec. 18, 2014

(65) Prior Publication Data

US 2015/0256082 A1 Sep. 10, 2015

Related U.S. Application Data

(63) Continuation-in-part of application No. 14/198,357, filed on Mar. 5, 2014, now Pat. No. 9,559,605.

(60) Provisional application No. 61/979,407, filed on Apr. 14, 2014.

(51) Int. Cl.
*H02J 7/02* (2016.01)
*H02M 3/335* (2006.01)
*H02J 50/20* (2016.01)
*H02J 17/00* (2006.01)

(52) U.S. Cl.
CPC ............. *H02J 50/20* (2016.02); *H02J 7/025* (2013.01); *H02J 17/00* (2013.01)

(58) Field of Classification Search
CPC ........................................................ H02J 50/20
See application file for complete search history.

(56) References Cited

U.S. PATENT DOCUMENTS

| | | | | |
|---|---|---|---|---|
| 5,570,276 A | * | 10/1996 | Cuk | H02M 3/005 323/266 |
| 5,663,635 A | * | 9/1997 | Vinciarelli | H02M 3/155 323/224 |
| 6,304,460 B1 | * | 10/2001 | Cuk | H02M 1/34 363/131 |
| 7,183,673 B2 | | 2/2007 | Dinn | |
| 7,778,046 B1 | * | 8/2010 | Cuk | H02M 3/157 323/222 |
| 8,621,245 B2 | | 12/2013 | Shearer et al. | |
| 8,830,710 B2 | | 9/2014 | Perreault et al. | |

(Continued)

OTHER PUBLICATIONS

U.S. Non-Final Office Action dated Sep. 26, 2018 for U.S. Appl. No. 14/576,048, 14 pages.

*Primary Examiner* — Jared Fureman
*Assistant Examiner* — Joel Barnett
(74) *Attorney, Agent, or Firm* — Womble Bond Dickinson (US) LLP (57) ABSTRACT

A DC-DC boost converter and apparatus including the same are disclosed. In one embodiment, the DC-DC converter comprises an input for receiving a first voltage at a first level, where the first voltage is negative; a transformer coupled to the input to convert the first voltage to a second voltage at a second level, where the second level is higher than the first level and the second voltage is positive; and an output connected to the transformer to output the second voltage.

12 Claims, 7 Drawing Sheets

(56) References Cited

U.S. PATENT DOCUMENTS

| | | |
|---|---|---|
| 2004/0078662 A1 | 4/2004 | Hamel et al. |
| 2006/0068749 A1 | 3/2006 | Ismail et al. |
| 2007/0133237 A1* | 6/2007 | Nakamura .............. H02M 7/06 363/62 |
| 2009/0200985 A1* | 8/2009 | Zane .................... H01Q 1/2225 320/108 |
| 2010/0156520 A1 | 6/2010 | Kume |
| 2011/0093041 A1 | 4/2011 | Straka et al. |
| 2012/0169140 A1 | 7/2012 | Cai |
| 2012/0256492 A1* | 10/2012 | Song ....................... H02J 1/102 307/66 |
| 2013/0132010 A1* | 5/2013 | Winger .............. G01R 31/3679 702/63 |
| 2013/0214607 A1* | 8/2013 | Harrison .............. H02M 3/335 307/82 |
| 2013/0214611 A1 | 8/2013 | Bae |
| 2013/0278072 A1 | 10/2013 | Yoon et al. |
| 2014/0117771 A1 | 5/2014 | Kwon et al. |
| 2014/0125144 A1 | 5/2014 | Nakamura et al. |
| 2014/0191593 A1 | 7/2014 | Moh |
| 2014/0290950 A1 | 10/2014 | Welsh et al. |
| 2014/0354041 A1 | 12/2014 | Yoshi et al. |
| 2015/0035378 A1 | 2/2015 | Calhoun et al. |
| 2015/0054345 A1 | 2/2015 | Monat et al. |
| 2015/0256015 A1 | 9/2015 | Gudan et al. |
| 2015/0256082 A1 | 9/2015 | Gudan et al. |

* cited by examiner

DC-DC BOOST CONVERTER

PRIORITY

The present patent application is a continuation-in-part of U.S. application Ser. No. 14/198,357, filed Mar. 5, 2014, entitled "System for Ambient Energy Harvesting," which is assigned to the corporate assignee of the present invention and also claims priority to and incorporates by reference the corresponding provisional patent application No. 61/979,407, entitled, "A 2.4 GHZ Ambient RF Energy Harvesting System with −20 dBm Minimum Input Power and NiMH Battery Storage," filed on Apr. 14, 2014.

FIELD OF THE INVENTION

Embodiments of the present invention relate to the field of wireless power transfer; more particularly, embodiments of the present invention relate to radio-frequency (RF) energy harvesting devices that harvest ambient RF energy and store the received RF energy.

BACKGROUND OF THE INVENTION

The Internet of Things is an application area with large commercial potential as well as significant technical challenges. An example application is the monitoring and control of heating, ventilating and air conditioning (HVAC) systems at the level of individual workers. In one case, continuous capture and communication of temperature, light level and humidity allowed for fine control of environmental conditions that improved worker comfort and efficiency and reduced energy costs by 24%. Fully deploying this approach for every office worker would require hundreds of millions of sensors.

Providing power to wireless sensors is typically addressed with onboard batteries. This is acceptable for small scale deployments where a handful of sensors can be regularly serviced by a technician. However, for large commercial applications in retail stores, for which there might be hundreds of sensors per location, this maintenance quickly becomes untenable.

Next generation sensor networks may be powered by energy harvesting techniques to avoid requiring battery maintenance. Energy harvesting is a process by which energy is derived from external sources (e.g., radio frequency energy, solar power, thermal energy, wind energy, salinity gradients, or kinetic energy), captured and stored.

Energy may be harvested from radio frequency signals propagating wirelessly. With RF harvesting, wireless energy comes from a radio frequency transmitting device that is some distance away from a device that harvests energy from the radio frequency transmission. Properties of an energy harvester include its ability to harvest energy efficiently from available RF signals, its ability to store the harvested energy efficiently with minimal storage loss, and its ability to make the stored energy available to meet the voltage, current, and duty cycle requirements of a desired application.

One of the more popular forms of RF used today is Wi-Fi (also referred to as IEEE 802.11a/b/g/n etc.) communications. Today, most Wi-Fi communications are in the 2.4 GHz and 5.8 GHz frequency bands and there are many local area networks that are based on Wi-Fi in which access points enable Wi-Fi clients to gain access to networks such as the Internet. Furthermore, the 2.4 GHz and 5.8 GHz bands also support other networking standards, such as Zigbee and Bluetooth, and other proprietary networks, each transmitting energy by communicating in this same frequency band.

Recent work has shown that Wi-Fi energy is abundant in a typical office environment, although at low power levels, e.g. yielding below −20 dBm at the feedpoint of a half-wavelength, 6 dBi gain patch antenna. Harvesting energy from ambient Wi-Fi has been the subject of several recent investigations. The typical solution includes rectification of the RF power incident on an antenna into DC charge on a capacitor. Provided that power can be harvested at a rate greater than the leakage of the capacitor, eventually enough energy will be accumulated to do useful work. A particular challenge of harvesting at low power levels is the fact that the rectified energy is both power limited as well as voltage limited. This voltage limitation is significant because there is typically some minimum start-up voltage exceeding 700-800 mV for running meaningful digital circuitry, with typical commercial microprocessors requiring as much as 1.8V. An added challenge in the Wi-Fi harvesting case is the bursty nature of Wi-Fi transmissions. While a typical transmission may include millisecond-duration high energy pulses at some interval that can be stored in a capacitor, the stored energy may be consumed by circuit leakage in between bursts.

Additionally there are other frequency bands that support different communication protocols, each of which transmit energy when they are communicating. These include, for example, digital television (DTV) and Global System for Mobile Communications (GSM) signals.

Boost converters are a well-known circuit for boosting a voltage. Because the output voltage from a rectifier is usually very low, boost converters are commonly used in RF energy harvesting circuits. A common type of boost converter is a non-resonant inductor-based boost converter. In this type of DC-DC converter, a switched node draws current into an inductor from a rectifier, so that when the switch opens, voltage builds in the inductor, forward-biases a diode, and is stored at a higher voltage in the output capacitor. A major liability of this approach is the control signal for driving the switching transistor (in that case, the gate node of a MOSFET). Also the power for the MOSFET gate drive often comes from an external power supply, not the rectified RF, so it is not a fully self-powered system.

An alternative boost converter uses a self-resonant transformer based DC-DC converter driven via a JFET. This booster is both self-starting and self-oscillating, and needs no externally supplied oscillator.

SUMMARY OF THE INVENTION

A DC-DC boost converter and apparatus including the same are disclosed. In one embodiment, the DC-DC converter comprises an input for receiving a first voltage at a first level, where the first voltage is negative; a transformer coupled to the input to convert the first voltage to a second voltage at a second level, where the second level is higher than the first level and the second voltage is positive; and an output connected to the transformer to output the second voltage.

In another embodiment, a device comprises: an antenna; a load; and an energy harvester coupled to the antenna and the load, where the energy harvester comprises an RF rectifier to output a first voltage determined by rectified RF energy in response to received RF energy; a DC/DC converter coupled to the RF rectifier to convert the first voltage to a second voltage, wherein the DC/DC converter comprises an input for receiving a first voltage at a first level, the first voltage being negative; a transformer coupled to the input to convert the first voltage to the second voltage at a second level, the second level being higher than the first level, and wherein the second voltage is positive; and an output connected to the transformer to output the second voltage; and an energy storage reservoir coupled to the output of the DC/DC converter to store energy at the second voltage.

In yet another embodiment, a device comprises: an antenna; an RF communication unit; a sensor; a controller; and an ambient RF energy harvester coupled to the antenna, where the RF communication unit, the sensor and the controller harvest ambient RF power to run the RF communication unit, the sensor and the controller, and where the RF energy harvester includes a DC/DC converter having an input for receiving a first voltage at a first level, the first voltage being negative; a transformer coupled to the input to convert the first voltage to a second voltage at a second level, the second level being higher than the first level, and wherein the second voltage is positive, and an output connected to the transformer to output the second voltage.

Embodiments of the invention can take other forms, such as, for example, methods.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

A system for ambient energy harvesting and method for doing the same are described. In one embodiment, the energy harvesting system includes a radio frequency (RF) energy harvester that trickle charges a battery from incident power levels (e.g., ultra-low incident power levels). In one embodiment, the harvester is operable to harvest RF energy from the 2.4 GHz industrial, scientific and medical (ISM) band in which IEEE 802.11 Wi-Fi operates. This allows it to leverage the ubiquity of energy that's produced by Wi-Fi or other types of devices (e.g., Bluetooth devices).

In one embodiment, the ambient RF energy harvester is part of a sensor/tag device and is used to provide energy to one or more components of the sensor/tag device such as, for example, the sensor, a controller, a communication unit a processing device, etc.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

In one embodiment, an energy harvesting apparatus stores RF energy into a battery using a boost converter and battery charging circuit. The boost converter receives the output voltage from an RF rectifier, boosts the voltage, and then sends it to the battery charging circuit to charge the battery. In one embodiment, the boost converter and battery charging circuit are optimized for input power levels below −20 dBm, where rectified voltages from a typical Schottky voltage doubler are below 100 mV. The battery is slowly trickle charged by transferring the charge from the capacitor to a rechargeable battery. In one embodiment, the battery has a much lower self-discharge rate than a capacitor and, therefore, can provide energy for sensor computation and wireless communication on a duty cycle commensurate with the rate at which the energy is harvested. In many cases, such as, for example, temperature readings for monitoring HVAC performance, one sensor reading and wireless transmission every few minutes is more than sufficient.

One Embodiment of a Sensor Device

Figure 1:
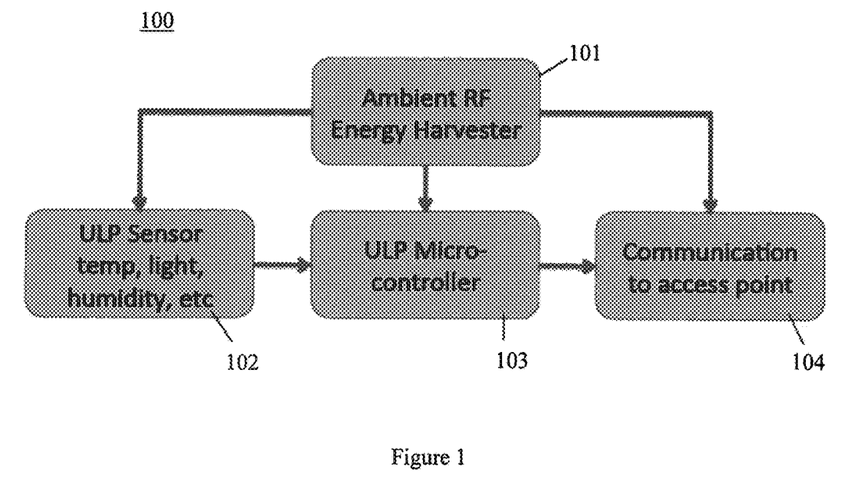
FIG. 1 is a block diagram of one embodiment of a sensor device.

FIG. 1 is a block diagram of one embodiment of a sensor device. The sensor device may be part of a tag. Referring to FIG. 1, sensor device 100 comprises an ambient radio-frequency (RF) energy harvester 101, an ultra-low-power (ULP) sensor 102 (e.g., temperature, light, humidity, pressure, health, etc.), a micro-controller 103, and a communication unit 104. Although not shown, sensor device 100 includes one or more antennas. The antennas may be part of communication unit 104 or may be separate, such as in the case of an antenna used to harvest energy.

In one embodiment, RF energy harvester 101 harvests ambient RF power to run ultra-low power tags and/or sensors 102, micro-controller 103, and/or communication unit 104, based on received RF input energy received by an antenna (not shown) of sensor device 100. There are a number of sources of ambient RF power, including, but not limited to WiFi, DTV and GSM signals. Other sources of ambient RF power include, for example, toys, proprietary communication protocols, and even stray energy leakage from devices, such as microwave ovens. The antenna receiving the RF energy input may be part of communication unit 104 or a separate antenna. The antenna(s) may be designed to receive the energy in multiple frequency bands, or there may be separate antenna(s) for these different frequency bands.

In one embodiment, sensor 102 comprises an ultra-low-power (ULP) sensor and/or tag and micro-controller 103 comprises an ultra-low-power (ULP) micro-controller. Sensor 102 may comprise a temperature sensor, a light sensor, a motion sensor, air flow sensor, image sensor, accelerometer, gyroscope, gas detector, microphone, atmospheric pressure sensor, humidity sensor, mechanical pressure sensor, etc. In one embodiment, sensor 102, as a ULP sensor, has a power requirement of 1-20 uW and a duty cycle of 1% to 10% (where the duty cycle varies in response to available energy over a period of time or the specific sensing needs, usually seconds to hours).

In one embodiment, micro-controller 103 performs control operations and/or processing for the sensor device 100.

In one embodiment, controller 103 is responsive to and receives sensor data from sensor 102 and provides it to communication unit 104 for transmission (e.g., wireless transmission) from device 100. Controller 103 may also log sensor data for a time, and transmit the entire log to communication unit 104 for transmission later. Note that in this case the sensing rate and the communication rate can be different.

Communication unit 104 provides a communication mechanism for sensor device 100. In one embodiment communication unit 104 is a wireless communication unit. In one embodiment, communication unit 104 has an RF transmission along with an antenna for receiving and transmitting RF signals, including RF signals transmitted with an access point or other locally positioned device.

In one embodiment, the ambient RF energy harvester 101 is optimized for overall efficiency and a minimum of start-up power. These optimizations improve the range at which energy can be usefully harvested and improve the number of places where ambient energy is practical, particularly in view of the fact that ambient RF energy levels are small and often bursty (traffic-dependent), rectified voltages are very low (<100 mV) at typical ranges, and typical Complementary Metal Oxide Semiconductor (CMOS) loads such as MCU etc. require 800+mV to operate.

An energy harvester and method for performing energy harvesting are described. In one embodiment, the energy harvester converts incident radio frequency (RF) energy, or ambient RF energy, to direct current energy. In one embodiment, the energy harvester comprises a first RF rectifier to output a first voltage determined by rectified RF energy in response to received RF energy. A first energy reservoir is coupled to the first RF rectifier to store energy at the first voltage. A DC/DC boost converter is coupled to the first energy reservoir to convert the first voltage to a second voltage, while a second reservoir coupled to the DC/DC converter to store energy at the second voltage, where the second voltage is greater than the first voltage. And a third reservoir (e.g., a longer-term energy storage device such as a low-leakage capacitor or battery, etc.) is coupled to the second reservoir to receive energy transferred from the second reservoir periodically.

In one embodiment, the RF rectifier comprises one selected from a group consisting of: a Schottkey diode, a P-N junction diode, a diode-connected field effect transistor, and a tunnel diode.

In one embodiment, the first reservoir comprises a capacitor with a capacitance value determined at least in part by the envelope of the received RF energy. In one embodiment, the first reservoir comprises a capacitor having a value based on stored energy above a threshold voltage given ambient RF input power and a duty cycle of the input power. In another embodiment, the first reservoir comprises a first capacitor and the second reservoir comprises a second capacitor, wherein capacitance of the second capacitor is approximately equal to a product of the first capacitor capacitance times a square of a ratio of an expected value of the second voltage divided by an expected value of the first voltage.

In one embodiment, the second reservoir comprises an inductor used to boost the voltage, wherein energy stored in the inductor is approximately equal to energy stored in the first reservoir.

In one embodiment, the DC/DC boost converter comprises a self-excited oscillator. In one embodiment, the self-excited oscillator comprises a transistor coupled to a transformer. In one embodiment, the frequency of the self-excited oscillator is controlled at least in part by an envelope of the received RF energy. In one embodiment, the DC/DC converter is a switch mode converter with switching intervals controlled at least in part by an envelope of the received RF energy.

In one embodiment, the third reservoir is coupled to the second reservoir via a switch, which is closed periodically to transfer energy from the second reservoir to the third reservoir. In one embodiment, the switch is controlled at least in part by the envelope of the received RF energy. In one embodiment, the third reservoir is coupled to a load, and the first voltage is insufficient to operate the load directly, and the third voltage is sufficient to operate the load. In one embodiment, the third reservoir has an energy storage capacity that is greater than an energy storage capacity of the second reservoir.

Figure 2:
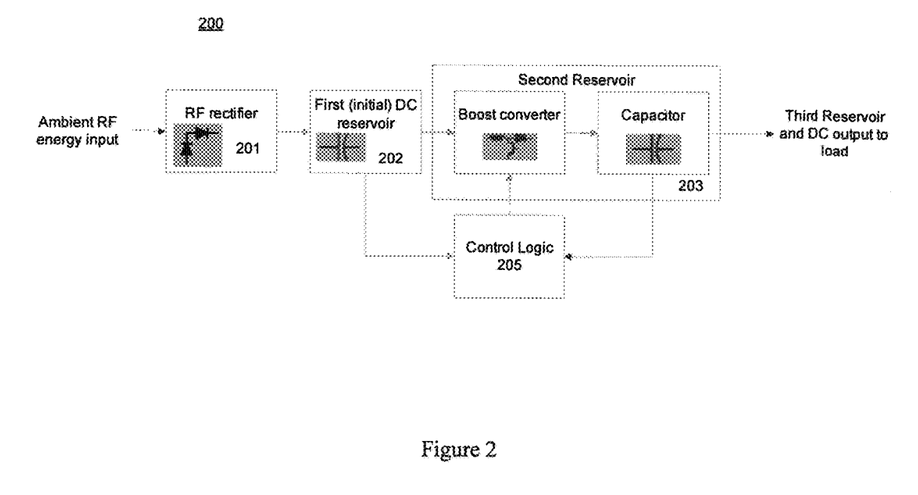
FIG. 2 is a block diagram of one embodiment of an RF energy harvester.

FIG. 2 is a block diagram of one embodiment of an RF energy harvester. Referring to FIG. 2, RF energy harvester 200 comprises RF rectifier 201, a first direct current (DC) reservoir (storage) 202, a boost converter and second reservoir 203, a third reservoir 204, and control logic 205.

RF rectifier 201 receives ambient RF energy input received from an antenna and rectifies the RF energy to produce a DC voltage.

First DC reservoir 202 stores the voltage generated from the rectified RF signals received by device 100. In one embodiment, reservoir 202 comprises a capacitor. In one embodiment, the size (value) of the capacitor that is selected for use is based on the stored energy above a voltage threshold for the ambient RF input power.

Figure 7A:
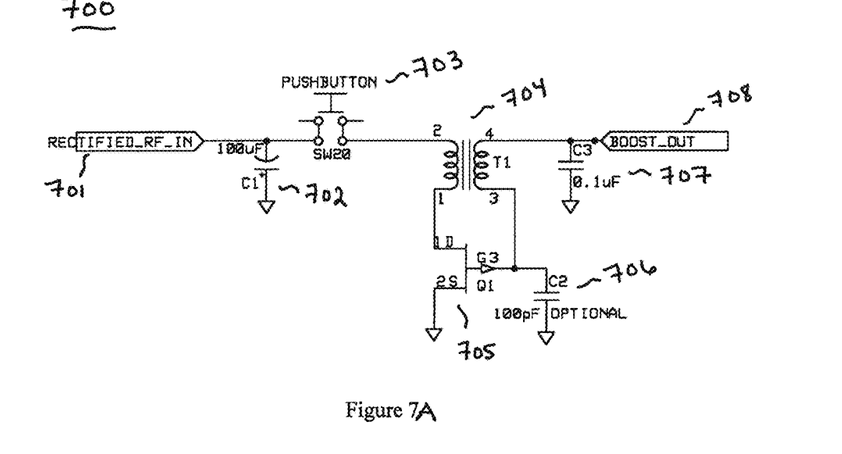
FIG. 7A illustrates one embodiment of a booster circuit.
Figure 7B:
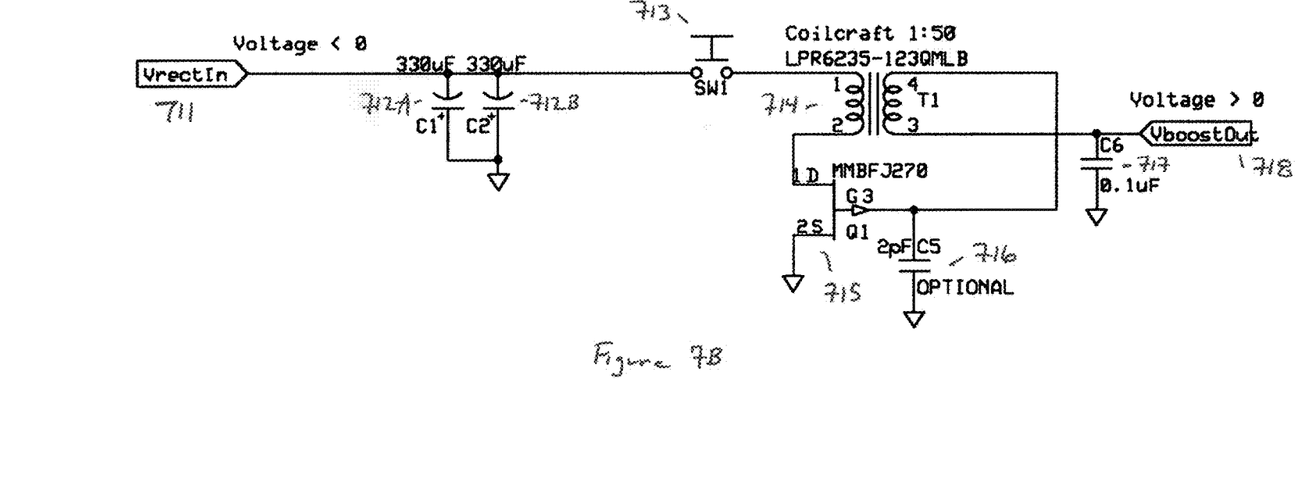
FIG. 7B illustrates an alternative embodiment of a booster circuit.
Figure 8A:
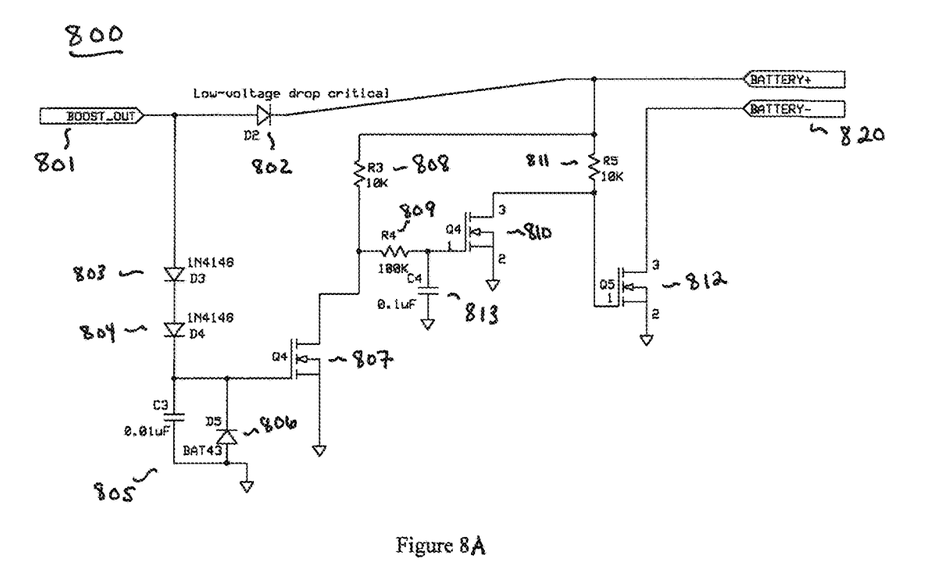
FIG. 8A illustrates one embodiment of a charger schematic.
Figure 8B:
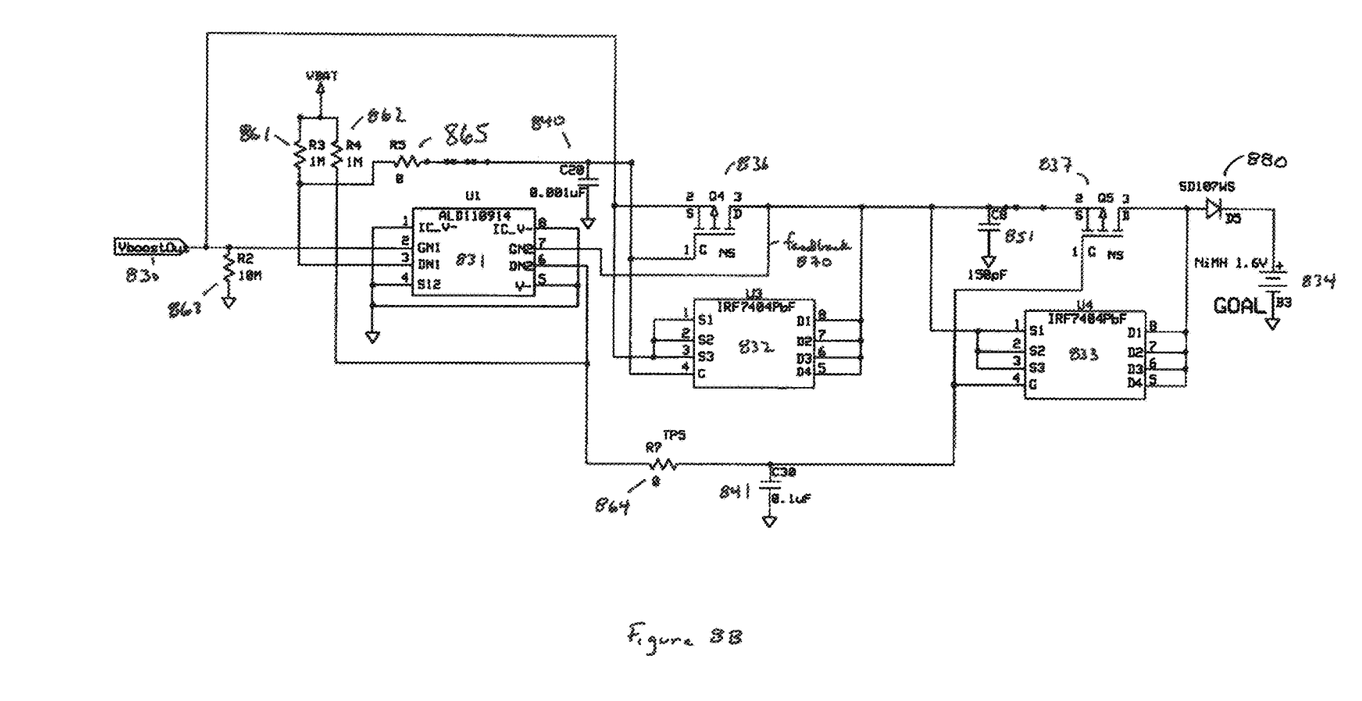
FIG. 8B illustrates an alternative embodiment of a charger schematic.

Second DC reservoir 203 receives the voltage and increases the voltage. To increase the voltage, second DC reservoir 203 includes a DC/DC converter. In one embodiment, the DC/DC converter comprises a boost converter which includes a self-excited oscillator for operation. The self-excited oscillator includes a junction field effect transistor (JFET) coupled with a transformer. In one embodiment, the amount of the boost conversion is a function of the input energy, and the DC/DC converter is designed to maximize the output voltage as a function of input voltage in this low-energy environment. FIGS. 7A and 7B illustrate embodiments of a booster converter circuit. FIGS. 8A and 8B illustrate embodiments of a charger schematic that receives the output of the boost converter, such as, for example, the one shown in FIGS. 7A or 7B.

The upconverted voltage from the DC/DC converter is stored in a storage device of second reservoir 203. In one embodiment, second reservoir 203 uses a capacitor to store the upconverted voltage. In another embodiment, second reservoir 203 uses an inductor to store the upconverted voltage, but this is a much shorter-term storage option.

When the energy stored in second reservoir 203 reaches a certain level, the energy is transferred to a third reservoir (not shown). Thus, the transfer occurs periodically at a rate determined by the amount of input energy. In one embodiment, the third reservoir comprises a battery, a capacitor, a supercap, etc. The third reservoir provides DC energy to a load.

In one embodiment, the load comprises a sensor, processor or microcontroller, and/or a communication unit. In one embodiment, the DC voltage from the third reservoir is able to run the load, while the voltage produced by rectifier 201 would not be able to do so.

Control logic 205 controls the energy harvesting process. In one embodiment, control logic 205 comprises a separate unit that generates control signals to control each of the reservoirs 202-203. In another embodiment, the control is distributed through various discrete gating components such that a separate control unit is not necessary but the function is still performed.

Figure 3:
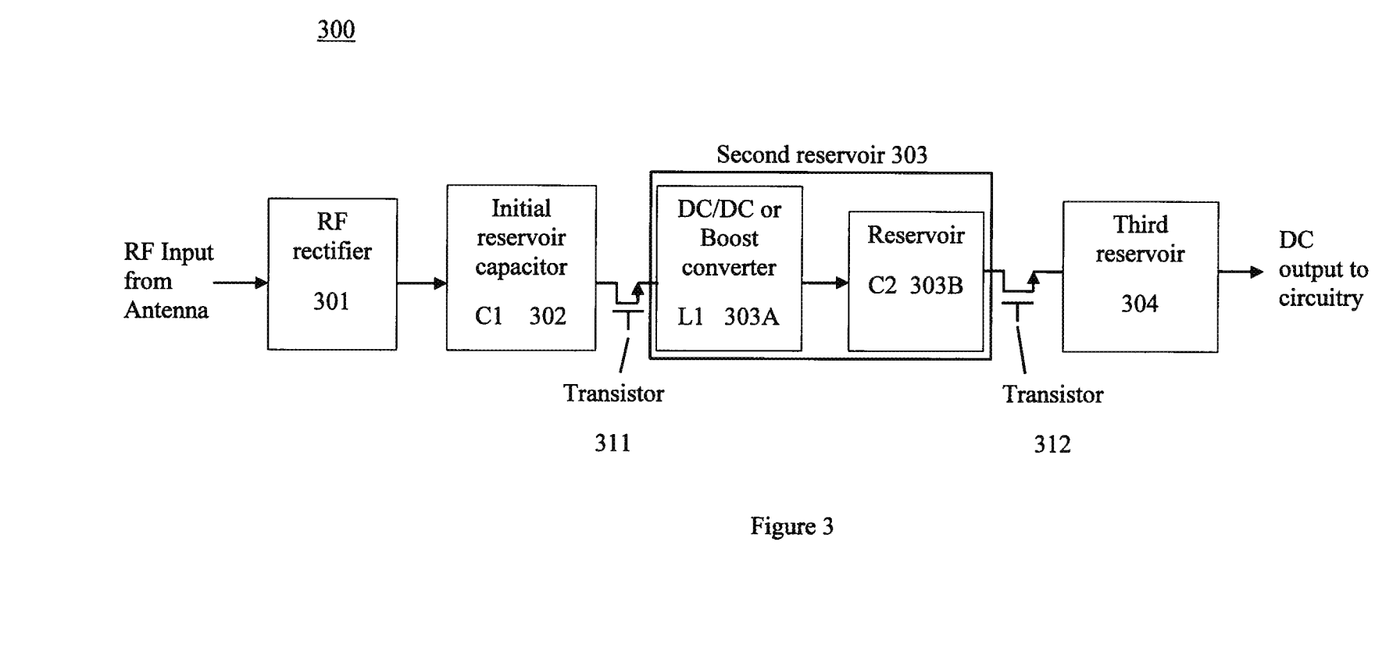
FIG. 3 is another more detailed block diagram of one embodiment of an RF energy harvester.

FIG. 3 is another more detailed block diagram of one embodiment of an RF energy harvester. Referring to FIG. 3, RF energy harvester 300 comprises RF rectifier 301, a first direct current (DC) reservoir (storage) 302, second reservoir 303, and a third reservoir 304. In one embodiment, the input to RF rectifier 301 is an RF input from an antenna on the sensor device. RF rectifier 301 converts the RF input signals to a voltage. In one embodiment, the voltage may range between 10 mV and 500 mV. The voltage is stored in reservoir 302. In one embodiment, reservoir 302 comprises a ceramic capacitor 1 uF to 100 uF or more.

In one embodiment, the stored energy from reservoir 302 is transferred to second reservoir 303 via a transistor 311, self-gated as the voltage rises in reservoir 302. In one embodiment, second reservoir 303 comprises a boost converter 303A. The boost converter 303A operates to upconvert the voltage stored in reservoir 302 and store that upconverted voltage into reservoir 303B.

The energy stored in second reservoir 303 is transferred to third reservoir 304. In one embodiment, third reservoir 304 comprises a tantalum capacitor, supercap 100 uF to 1 F or a battery. In one embodiment, transistor 312 (e.g., a FET) couples second reservoir 303 to third reservoir 304, which turns on when second reservoir 303 reaches an optimal voltage. In one embodiment, transistor 312 is controlled at least in part by the envelope of the received RF energy such that when the voltage stored in reservoir 303B reaches a certain watermark level, transistor 312 closes/turns on and the energy is transferred. In one embodiment, through the selection of high gate-threshold transistors, the voltage can build up fairly high in reservoir 303(as much as 1-2V) before the transistor 312 closes/turns on. Transistor 312 closes/turns on automatically when the gate threshold of the transistor design is reached in reservoir 303. As soon as transistor 312 closes/turns on, the energy is transferred from reservoir 303 into reservoir 304, thus depleting the energy in reservoir 303, and the gate threshold falls below the watermark level and the transistor 312 closes/opens again. The process then repeats when the voltage in reservoir 303 becomes sufficiently high.

Note that transistor 311 and 312 may be replaced with other types of switches.

Waveform Aware Harvesting

In one embodiment, the RF waveform harvester comprises a RF to DC converter that is optimized for use with non-continuous wave (CW) signals. In another embodiment, the RF waveform harvesters are waveform aware and are able to perform ambient energy harvesting based on a waveform model, where the available RF energy is in the form of communication waveforms of a variety of types. Examples of commonly-harvested ambient RF energy sources with non-continuous wave signals include, but are not limited to, digital television (DTV) broadcasts, cellular base station transmissions (e.g., GSM, Code Division Multiple Access (CDMA)), Wi-Fi transmissions, etc.

For example, in one embodiment, WiFi is the communications waveform that is the ambient form of energy to be harvested. WiFi is bursty and has low amplitude compared to other sources of energy, where a bursty signal has a high peak to average ratio over ms to s time scale. For example, some WiFi signals have WiFi transmission burst times on the order of 1 ms. For a bursty signal, the harvester can only contribute energy to the reservoir capacitor ($C_x$) when the ambient source is transmitting.

Figure 4:
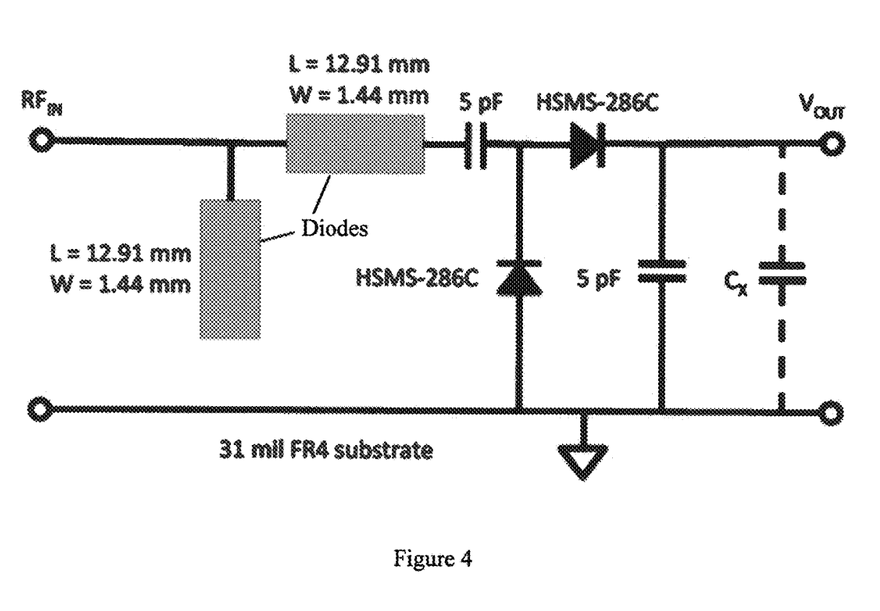
FIG. 4 illustrates one embodiment of a diode-based rectifier schematic.

FIG. 4 illustrates a diode-based harvester schematic. Referring to FIG. 4, in one embodiment, the harvester is designed to be well matched at input power levels below −20 dBm where the majority of ambient Wi-Fi signals are expected to fall. Thus, harvester is characterized both in terms of its input match from 2.4 GHz to 2.5 GHz, as well as for harvesting efficiency at its maximum power point (MPP). Harvesting efficiency is defined as the ratio of input RF power at the harvester to harvested DC power at the load ($\eta$=PDC/PRF).

The purpose of capacitor $C_x$ in FIG. 4 is to store charge for any subsequent active electronic circuitry. In one embodiment, typical circuit power-up threshold voltages $V_{TH}$ equals 0.8 V, as is typical for CMOS logic in commodity processes. In another embodiment, the power-up threshold voltages $V_{TH}$ equals 50 mV, as is typical for ultra-low startup voltage boost converters using JFETs. Alternatively, specially doped CMOS transistors, floating gate devices, or Silicon on Insulator (SOI) transistors may be capable of operation down to voltages approaching $V_{TH}$=50–100 mV as well.

If the usable energy is defined as the portion of the stored energy above some threshold voltage $V_{TH}$, the following describes how to find a value of $C_x$ given the ambient RF input power and the signal's duty cycle. This is based on the maximum power point curve for the harvester, the typical burst timings for the ambient signal of interest (e.g., WiFi with some traffic model), and a time domain response for the harvester as a function of $C_x$. Thus, in one embodiment, the storage capacitor selection $C_x$ is optimized on the time scale of network traffic for the signal being harvested.

Figure 5:
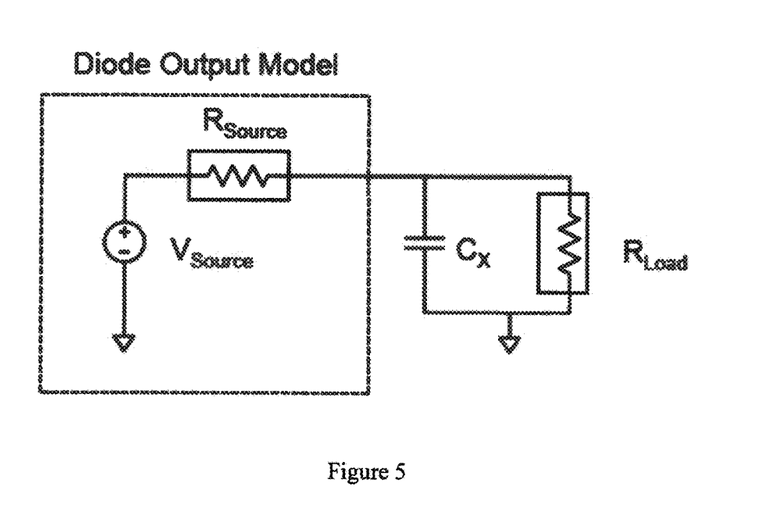
FIG. 5 illustrates one embodiment of a diode output circuit model.

FIG. 5 illustrates a diode output circuit model. Because the diode is a non-linear device, the power delivered to the load varies dramatically with load impedance. The Maximum Power Point Tracking (MPPT) circuit functions as a load impedance converter to maximize the power delivered to the load, given a particular nonlinear operating point.

Referring to FIG. 5, the diode output model consists of an open-circuit voltage $V_{source}$ along with a nonlinear source resistance $R_{source}$. The pair, $V_{source}$, $R_{source}$, represents a fixed operating point at maximum power-point (MPP). The load resistance $R_{load}$ includes any leakage currents in $C_x$ as well as the quiescent current of the active circuitry attached to the harvester. In other words, the load impedance $R_{load}$ is chosen a priori based on the MPP of the harvester at a given ambient signal level (the maximum power point of the harvester given the input power). Using this model, only the effect of varying $C_x$ (not other system conditions) is considered.

Figure 6A:
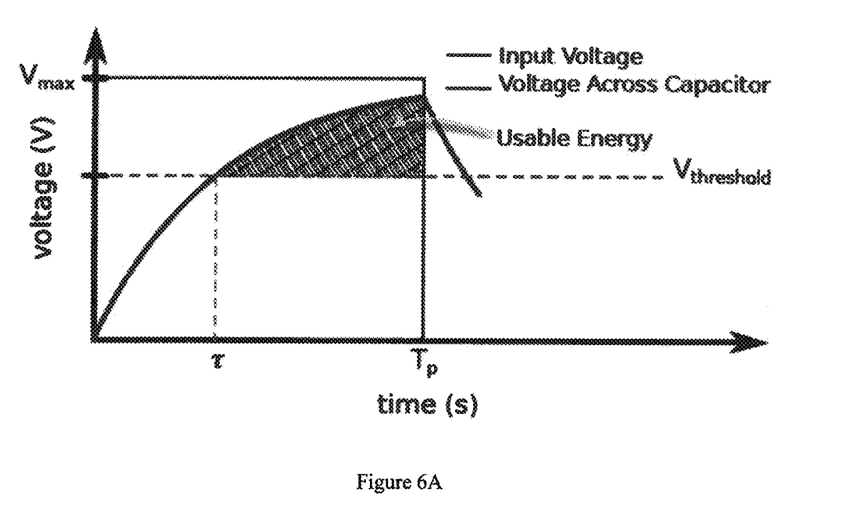
FIG. 6A illustrates the usable energy stored in capacitor $C_x$ during one transmission burse of duration $T_p$ according to one embodiment.

FIG. 6A illustrates the usable energy stored in capacitor $C_x$ during one transmission burse of duration $T_p$. Referring to FIG. 6A, the usable energy in $C_x$ is represented as the shaded portion of the curve above the voltage threshold and below the voltage across the capacitor.

Figure 6B:
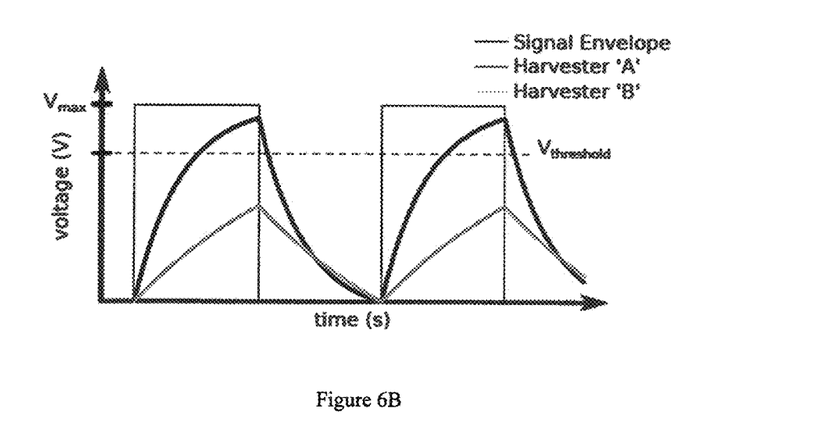
FIG. 6B illustrates examples of good and bad choices of $C_x$.

FIG. 6B illustrates examples of good and bad choices of $C_x$. If $C_x$ is too large, the active circuitry will never be powered because the input energy is insufficient to generate voltage above the threshold. On the other hand, if $C_x$ is minimized, little energy will be stored in the reservoir $C_x$ and the runtime of the active circuitry will not extend beyond the transmission intervals of the RF source. Referring to FIG. 6, harvesters 'A' and 'B' represent different choices for $C_x$ with the same conditions otherwise. In harvester A, $C_x$ looks appropriate as the output voltage exceeds $V_{TH}$ during each burst, while in harvester B, $C_x$ is too big and the output voltage never exceeds $V_{TH}$ so there is no usable energy.

An expression is derived for the useful-energy-maximizing reservoir capacitance $C_x$ as a function of ambient RF signal duty cycle and the load impedance RL at a diode harvester's maximum power point. The expression may be used to calculate the usable energy as a function of the known parameters and the unknown capacitance $C_x$.

The total energy in $C_x$ may be expressed as follows:

$$E = \tfrac{1}{2} CV^2$$

where C is the capacitance and V is the terminal voltage of $C_x$. It is assumed that the energy stored on the capacitor is only usable when the capacitor voltage is above the desired threshold $V_{TH}$. The usable energy is thus the difference between the stored energy at the end of an RF transmission (at time t=$T_p$) and the stored energy when $C_x$ is charged only to $V_{TH}$ and is expressed as follows:

$$E_{usable} = \tfrac{1}{2} C[V_{T_p}^2 - V_{th}^2]$$

where $V_{T_p}$ is the terminal voltage on $C_x$ at the end of an RF transmission (e.g., at the end of each burst) of duration $T_p$ and is expressed as:

$$V_{T_p} = V_{src}(1 - e^{-T_p/R_L C})$$

By substitution, the equation for the usable energy may be re-written in terms of C and the known values of $R_L$, $V_{TH}$ and $T_p$ as follows:

$$E_{usable} = \tfrac{1}{2} C V_{T_p}^2 \left[ e^{-\tfrac{2T_p}{R_L C}} - 2e^{-\tfrac{T_p}{R_L C}} + \left(1 - \left(\tfrac{V_{th}}{V_{T_p}}\right)^2\right) \right]$$

The equation may be solved for $E_{usable}$ as a function of $C_x$.

Thus, a new class of RF energy harvesters, referred to herein as waveform aware harvesters, have been described. These RF energy harvesters are RF to DC converters that are optimized for their performance with non-CW signals.

A Rectenna Embodiment

In one embodiment, the antenna the RF rectifier of the RF energy harvester are combined together to form a rectenna. In one embodiment, the antenna is a dual-linear polarized wideband probe fed air dielectric circular patch antenna, that is composed of two layers of double-sided printed circuit substrate. The front PCB carries the circular patch itself, implemented on the top and bottom layers of the front PCB. The back PCB serves as the ground plane for the patch antenna and also carries dual RF rectifiers, one for each polarization. The back PCB also carries the DC power management circuitry. In one embodiment, the circular patch itself is 59 mm diameter on a 100 mm2 board. The boards are separated by 5 mm aluminum spacers, which serve as probe feeds to the air dielectric patch. An advantage of this antenna design is that both horizontal and vertical polarized energy is captured by a single antenna and made available to two rectifiers without the power combining loss typical of a single feedpoint, circularly polarized antenna. Another advantage of the probe-fed design is that the center of the patch is at DC ground to reduce, and potentially minimize, ESD damage to the fragile RF diodes. In one embodiment, the antenna is fabricated on 0.031" thick, double sided Rogers 4003 substrate material.

In one embodiment, the rectenna includes rectifying diodes. In one embodiment, the rectifying diodes are HSMS-286C RF detector diodes from Avago and are used in the single stage voltage doubler configuration, with separate rectifiers on each of the two feedpoints of the antenna. In one embodiment, a microstrip matching networks are used instead of lumped L- and C-elements to increase, and potentially maximize, element Q.

DC-DC Boost Converter Embodiments

FIG. 7A is a circuit schematic of one embodiment of a DC-DC boost converter. In one embodiment, the boost converter receives a negative voltage as an input, and switches the current through the transformer via a p-channel JFET in order to produce a positively-biased boosted voltage output.

The boost converter includes an input capacitor which is the same as the capacitor of the first DC reservoir (e.g., reservoir 202 of FIG. 2, initial reservoir capacitor 302 of FIG. 3). In another embodiment, there is an output capacitor after the boost converter. This capacitor can be the same as the capacitor that is used as the charger input capacitor. The relative values of the capacitors are selected so that conservation of energy holds because an output capacitor that is too small will lose energy, but one that is too large will result in limited boosted voltage output. A 1000:1 ratio of capacitances is a good "rule of thumb" to apply, though other ratios may be used. In one embodiment, a capacitance ratio of the first capacitor to the second capacitor may be 6000:1.

In one embodiment, in order to start the boost converter, it is necessary to allow at least 40-50 mV to build up across the input capacitor before adding the boost converter load (e.g., before allowing the boost converter to output its boosted voltage output). A pushbutton switch is an easy way of meeting this need according to one embodiment. In alternative embodiments, a dedicated circuit element is used in place of the push button. For example, an ultra-low power comparator (e.g., operational amplifier), an ultra low-power relay, or a momentary switch (e.g., a rocker switch) can be used to hold off the boost converter until sufficient energy is stored in the rectifier capacitor.

Referring to FIG. 7A, boost converter 700 comprises an input 701 and an output 708. In one embodiment, input 701 is a rectified RF input. In one embodiment, the rectified RF input is a negative voltage that is produced by a rectifier (not shown in FIG. 7A to avoid obscuring the present invention) in which diodes are reversed in their position (flipped upside down) so that their conducting ground is to the negative voltage (instead of ground to positive).

Input 701 is connected to a capacitor 702 (e.g., C1) and a push button 703. Capacitor 702 is connected between input 701 and ground. In one embodiment, capacitor 702 is a 100 μf capacitor.

Push button 703 (e.g., SW20) is also coupled to a first winding of transformer 704 (e.g., T1). In one embodiment, transformer 704 is a Coilcraft LPR6235 transformer with 1:20 turns ratio. In one embodiment, the turns ratio is increased from 1:20 to 1:50, which increases the gain of the booster without introducing unacceptable losses. The other end of the first winding of transformer 704 is connected to a drain of p-channel junction field-effect transistor (JFET) 705. The source (e.g., 2S) of transistor 705 is connected to ground. The gate (e.g., G3) of transistor 705 is connected to an end of the second winding of transformer 704. In one embodiment, the gate of transistor 705 is also coupled to capacitor 706 (e.g., C2) which is also connected to ground. Note that capacitor 706 is optional. In one embodiment, capacitor 706 is a 100 pF capacitor. In one embodiment, transistor 705 is a MMBJF201 transistor from Fairchild Semiconductor.

The other end of the second winding of transformer 704 is connected to output 708. Output 708 is also connected to capacitor 707 (e.g., C3) which is also connected to ground. In one embodiment, capacitor 707 is a 0.1 μF capacitor. That is, capacitor 707 is 1/1000th of capacitor 706.

In operation, at first, when the RF rectified input voltage is received, it charges up capacitor 702. At this point, while charging up capacitor 702, there is no current flowing through the first winding of transformer 704 or through transistor 705 as transistor 705 is off.

When the charge on capacitor 702 reaches a predetermined level, push button 703 is activated and current starts to flow through the first winding of transformer 704. In one embodiment, the booster begins to function when as low as 50 mV is available on capacitor 702, so push button 703 can be pressed at any time after the 50 mV point. Of course, the greater the voltage on capacitor 702, the greater the boosted voltage output on capacitor 707.

Once push button 703 is pushed, the voltage of the first winding of transformer 704 is transformed into a higher voltage on the second winding of transformer 704. Capacitor 707 and transformer 704 form an LC resonant circuit. With ideal inductors and diodes, the magnetic field of the inductor is transferred to the electric field of the capacitor, and then back again. This would resonate indefinitely in an ideal case, building up voltage on capacitor 707, provided there is enough startup energy in capacitor 702. Also, in one embodiment, since the rectified input voltage is negative, the voltage at capacitor 706 is positive.

But no actual electronic circuits are ideal; there are always losses. Therefore, eventually, the charge stored in capacitor 702 depletes due to the transfer of boosted voltage energy into capacitor 707, through transformer 704 and the charging of capacitor 707. At this point, the LC resonant oscillations stop, push button 703 is closed, and capacitor 702 returns to storing charge. Thereafter the process of storing and transferring charge repeats in the future. In one embodiment, the oscillations are on the order of 100 KHz, and they self resonate for 200-300 msec.

FIG. 7B is a circuit schematic of an alternative embodiment of a DC-DC boost converter. In one embodiment, the boost converter receives a negative voltage as an input, and switches the current through the transformer via a p-channel JFET in order to produce a positively-biased boosted voltage output.

The boost converter includes a pair of input capacitors 712A-712B which in one embodiment represents the capacitor of the first DC reservoir (e.g., reservoir 202 of FIG. 2, initial reservoir capacitor 302 of FIG. 3). In one embodiment, each of capacitors 712A and 712B is a 330 μF capacitor. In one embodiment, the capacitance of capacitors 712A and 712B is a large capacitance (e.g., greater than 100 μF). In one embodiment, the capacitance is increased from 100 μF to 660 μF, which increases the stored energy in a reasonable time frame. Note that the capacitance of capacitors 712A and 712B is about 6× the size of the input capacitor in FIG. 7A. In another embodiment, there is an output capacitor after the boost converter. This capacitor can be the same as the capacitor that is used as the charger input capacitor.

Referring to FIG. 7B, the boost converter comprises an input 711 and an output 718. In one embodiment, input 711 is a rectified RF input. In one embodiment, the rectified RF input is a negative voltage that is produced by a rectifier (not shown in FIG. 7B to avoid obscuring the present invention) in which diodes are reversed in their position (flipped upside down) so that their conducting ground is to the negative voltage (instead of ground to positive).

Input 711 is connected to a capacitors 712A and 712B and a push button 713. Capacitors 712A and 712B are connected between input 711 and ground.

Push button 713 (e.g., SW1) is also coupled to a first winding of transformer 714. In one embodiment, transformer 714 is a Coilcraft LPR6235 transformer with 1:50 turns ratio, which provides a higher multiplier than the transformer 704 in FIG. 7A. The other end of the first winding of transformer 714 is connected to a drain of p-channel junction field-effect transistor (JFET) 715. The source of transistor 715 is connected to ground. The gate of transistor 715 is connected to an end of the second winding of transformer 714. In one embodiment, the gate of transistor 715 is also coupled to capacitor 716 (e.g., C5) which is also connected to ground. Note that capacitor 716 is optional. In one embodiment, capacitor 716 is a 2 pF capacitor. In one embodiment, transistor 715 is a MMBFJ720 transistor from Fairchild Semiconductor®.

The other end of the second winding of transformer 714 is connected to output 718. Output 718 is also connected to capacitor 717 (e.g., C6) which is also connected to ground. In one embodiment, capacitor 717 is a 0.1 µF capacitor.

The detailed functionality of FIG. 7B is identical to that of FIG. 7A, so that description will not be repeated here, but the performance, due to the component value changes, is more efficient in FIG. 7B than 7A.

A Battery Charger Embodiment

In one embodiment, a battery charger is included to charge a rechargeable storage device. In one embodiment, the rechargeable storage device is a rechargeable battery. In one embodiment, where voltages are commonly less than 2V, a Nickel Metal Hydride (MiMH) battery is used as the rechargeable battery. NiMH batteries discharge at 1.5V and can be trickle-charged indefinitely, without concern for overcurrent or overcharging, at around 2.3V. Alternatively, a lithium battery can be used but is not ideal, because energy is lost both on boosting up to their terminal voltage, as well as regulating back down (assuming the sensor electronics are running at a nominal 1.8V or even lower) for the load. Thus, a battery charging system designed for MiMH batteries are therefore more efficient than lithium under these operating conditions.

It is assumed that the input energy is limited (Wi-Fi harvesting), so that the battery is not at risk of charging at a rate greater than one tenth of its capacity in mAh (called the C/10 rate). With a small 1.8 mAh button-cell-like battery, the charging current is less than 180 uA/hour.

In one embodiment, the battery charger includes an array, or group, of transistors to allow for the boost converter to build up the voltage to the charging circuit. Once the voltage has been built up, the energy is gated into the battery. In one embodiment, the gating is performed using a n-channel MOSFET. Thereafter, the cycle of waiting while the voltage builds up and then gating energy into the battery, which depletes the voltage build up, repeats all over again.

Similarly, the battery charger includes a number of diodes used can be selected to ensure the appropriate voltage build-up. For example, in one embodiment, the battery charger includes a pair of diodes, the cathode of the second which controls the gate of the first transistor in the array of transistors, and the pair of diodes connected into the gate of the first transistor are sized to ensure an appropriate voltage buildup after the boost converter. The number of diodes used determines the amount of voltage build-up, as a typical diode forward voltage drop is 1.4V. In FIG. 8A, a voltage of 1.4V is implemented.

In one embodiment, a diode is connected in series with the charging path (e.g., from the input of the battery charger to the positive terminal of the battery) to prevent back current from the battery to flow into the charge-detection circuitry (which may be part of the battery charger or may be part of a DC/DC boost converter). A final gate (e.g., a MOSFET) connects the battery ground to the charger ground, thus allowing current flow into the battery. Alternatively, p-channel MOSFET can be used to switch the power into the battery.

Thus, in one embodiment, the novel charger design is optimized to the needs of a NiMH charging system, enabling trickle-charging without requiring a complex charge management system as is typical for lithium or lithium polymer batteries.

Because a NiMH battery is used, there is no need for a down converter on the load nor a charge counter that is used with Lithium batteries to count the amount of energy that has been stored.

FIG. 8 is a circuit schematic of one embodiment of a battery charger. Referring to FIG. 5, battery input 801 is connected to the input of diode 802 (e.g., D2) and a pair of cascade connected diodes 803 (e.g., D3) and 804 (e.g., D4). The cathode of diode 802 is connected to the positive ("+") terminal of battery 820.

The cathode of diode 804 is connected to capacitor 805, which is connected to ground. In one embodiment, capacitor 805 is a 0.01 uF capacitor. The input of diode 806 (e.g., D5) is connected ground and the output of diode 806 is connected to a node connecting the output of diode 804 and capacitor 805.

The gate of transistor 807 (e.g., Q4) is also connected to the node connecting the output of diode 804 and capacitor 805. In one embodiment, transistor 807 is a n-channel MOS field-effect transistor. The source of transistor 807 is connected to ground, while the drain of transistor 807 is connected to one end of resistors 808 and 809. In one embodiment, resistors 808 and 809 are 10K Ohm and 100K Ohm, respectively.

The other end of resistor 808 is connected to the + terminal of battery 820, forming a self-powered pull-up resistor. The other end of resistor 809 is connected to capacitor 813(e.g., C4), which is also connected to ground, and the gate of transistor 810. In one embodiment, transistor 810 is an n-channel MOS field-effect transistor (MOSFET). In one embodiment, capacitor 813 is a 0.1 uF capacitor. Resistor 809 and capacitor 813 form an RC time delay circuit, allowing further build-up of energy before charging the battery.

The source of transistor 810 is connected to ground while its drain is connected to one end of resistor 811 and the gate of transistor 812 (e.g., Q5). In one embodiment, resistor 811 is 10K Ohm. The other side of resistor 811 is connected to the + terminal of battery 820, again forming a pull-up resistor. The source of transistor 812 is connected to ground while its drain is connected to the negative ("−"), or ground, terminal of battery 820.

In operation, the connection to battery 820 is normally an open circuit. The connection to battery 820 is made when a charge pulse is to be stored in battery 820. The negative terminal of battery 820 is connected to ground when transistor 812 is turned on.

Transistors 807 and 810, in combination with diodes 803 and 804, are used to hold off and wait for the voltage to reach a particular level before putting the voltage into energy storage. Diodes 803 and 804 force two diode drops onto the gate of transistor 807. When the voltage is high enough, transistor 807 turns on. Once transistor 807 turns on, there is a predetermined period of time before transistor 810 turns on. This is due to the RC time constant associated with the RC circuit consisting of resistor 809 and capacitor 813. Once transistor 810 turns on, then transistor 812 turns on, thereby causing the battery to charge.

When the voltage on the input from the boost converter drops to a level at which transistor 807 turns off, because the energy has been transferred into the battery, then transistor 810 turns off after the delay due to the RC circuit, thereby causing transistor 812 to turn off. At this point, the charging of battery 820 stops.

Note that transistor 810 acts an inversion transistor to change the polarity of the signal on the gate of transistor 812, so that it turns on with the appropriate polarity. Note that some of the energy stored in capacitor 805 is used to turn on the gate of transistor 807.

Pull-up resistors 809 and 811 are used to control the gates of transistors 810 and 812 respectively. Specifically, these resistors provide a defined logic level for the gates of transistors 807 and 810 off when the voltage level at the input of the boost converter drops to a particular level.

Diode 806 is used for stabilization by bring stability to the gate of transistor 807 to compensate for oscillation that occurs on the node connecting the output of diode 804 and the gate of transistor 807, and it also prevents over-voltage build-up on that node.

Diode 802 is connected in series between input 801 and the + terminal of battery 820 to prevent back current from the battery to flow in the opposite direction.

FIG. 8B is a circuit schematic of an alternative embodiment of a battery charger for a similar type of battery system as FIG. 7B. The battery charger of FIG. 8B uses p-channel MOSFETs to switch energy directly into the battery terminal, as well as high-switching speed n-channel MOSFETs in the control section to reduce leakage during the gate transition range because of slow edge rates.

Referring to FIG. 8B, the battery charger includes a battery charger input 830, a battery charger output at battery 834, transistors 831-833, 836 and 837, capacitors 841 (e.g., C30), 842 and 851 (e.g., C8), and resistors 861-865 (e.g., R3, R4, R5). Transistor 836 is directly in parallel with transistor 832, and transistor 873 is directly in parallel with transistor 833. In one embodiment, transistors 832 and 833 are used and 836 and 837 are not used. In another embodiment, these can be reversed. The difference here is different packages for different types of transistors. Transistors 836 and 837 are 3-pin parts, while 832 and 833 are 8-pin parts. In the discussion that follows, transistors 832 and 833 will be used.

Battery charger input 830 is coupled to the positive ("+") terminal of the battery at battery charger output 834 via transistors 832 and 833. In operation, the connection to the battery at battery 834 is normally not connected. The connection to battery 834 is made when a charge pulse is to be stored in the battery. The positive terminal of the battery 834 is connected to the charged energy at input 830. When p-channel MOSFET transistors 832 and 833 are on, energy flows into the battery.

Battery charger input 830 is also connected to the gate input of transistor 831. Transistor chip 831 is a sub-threshold n-channel MOSFET chip that includes a pair of n-channel transistors. The first of these transistors turns on when the voltage on its gate input (GN1) is at or above a predetermined level. In one embodiment, transistor 831 is an ALD110914 transistor from Advanced Linear Devices that turns on when the voltage on its gate is 1.4v.

When the first of the transistors of transistor chip 831 turns on, its drain output (DN1) is pulled down (because it is now conducting to the source S12 which is ground). The drain output DN1 of the first transistor in transistor chip 831 is coupled to the gate of transistor 832, and because transistor 832 is a p-channel mosfet, when its gate is low, transistor 832 turns on. When transistor 832 turns on, the voltage from battery charger input 830 passes through transistor 832 and causes a signal from feedback 870, which is coupled to the gate input (GN2) of the second transistor of transistor chip 831, to be received by the gate input GN2 and after a delay the voltage reaches high enough to turn on that second transistor.

When the second of the transistors of transistor chip 831 turns on, its drain output (DN2) is pulled down (because it is now conducting to the source S12 which is ground). The drain output DN2 of the second transistor in transistor chip 831 is coupled to the gate of transistor 833 and similarly to transistor 832, because transistor 833 is a p-channel mosfet, when its gate is low, transistor 833 turn on. At this point, since both transistors 832 and 833 are on, the voltage from battery charger input 830 charges the battery 834.

Thus, the voltage from battery charger input 830 controls transistor chip 831, which in turn controls transistors 832 and 833, to cause the battery at battery output 834 to be charged.

Resistors 861 and 862 are pull-up resistors that are designed to provide a bias to the drains of both transistors in 831, to keep transistors 832 and 833 off while the drain outputs DN1 and DN2, respectively, are high (because the two transistors in transistor chip 831 are off).

Resistor 863 is used to weakly discharge any remaining voltage on battery charger input 830 when the booster circuit (e.g., FIG. 7A, FIG. 7B, etc.) is not outputting a voltage into battery charger input 830, to prevent a brown-out startup condition in the booster circuit.

In one embodiment, resistors 864 and 865 are 0-ohm resistors and are direct electrical shorts. Their presence allows for easy access to probe and debug the charger circuit, but they are not required.

Capacitor 851 is coupled to the output to provide DC stability. In one embodiment, capacitor 851 is a 150 pF capacitor.

Capacitors 840 (e.g., C20) and 841 are used to adjust the timing of when the gates of transistors 832 and 833 are at a low enough voltage to turn on by slowing down their falling edge. This is because the pull-up transistors 861 and 862 in combination with the voltage source VBAT cause capacitors 840 and 841 to be charged up at the time when the transistors of transistor chip 831 turn on. This charge will drain slowly and the delay caused by the draining of these capacitors allows more energy to build up prior to transistors 832 and 833 from both being turned on. In one embodiment, capacitor 840 is a 0.001 µF capacitor, and capacitor 841 is a 0.1 µF capacitor.

Diode 880 is used to prevent current backflow from the battery into the charger circuit when the circuit is idle (i.e., when waiting for harvested energy to build up before the booster circuit).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A DC/DC converter comprising:
an input for receiving a first voltage at a first level, the first voltage being negative;
a first capacitor connected to the input;
a transformer coupled to the input and the first capacitor, via a switch, to convert the first voltage to a second voltage at a second level, the second level being higher than the first level, and wherein the second voltage is positive, wherein the switch is closed to connect the input to the transformer after voltage across the first capacitor builds up to a predetermined level, the predetermined level set to hold off the transformer until sufficient energy is stored in the first capacitor;
an output connected to the transformer to output the second voltage; and
a second capacitor connected to the output, wherein capacitance ratio of the first capacitor to the second capacitor is 1000:1 or 6000:1.

2. The converter defined in claim 1 wherein the input is to receive a rectified input.

3. The converter defined in claim 1 further comprising a transistor connected to the transformer to switch current through the transformer in order to convert the first voltage to the second voltage.

4. The converter defined in claim 1 wherein the transistor comprises a p-channel transistor.

5. The converter defined in claim 1,
wherein capacitance ratio of the first capacitor to the second capacitor is 1000:1, the converter further comprising:
a p-channel transistor connected to the transformer to switch current through the transformer in order to convert the first voltage to the second voltage.

6. A device comprising:
an antenna;
a load; and
an energy harvester coupled to the antenna and the load, wherein the energy harvester comprises
an RF rectifier to output a first voltage determined by rectified RF energy in response to received RF energy;
a DC/DC converter coupled to the RF rectifier to convert the first voltage to a second voltage, wherein the DC/DC converter comprises
an input for receiving a first voltage at a first level, the first voltage being negative;
a first capacitor connected to the input;
a transformer coupled to the input and the first capacitor, via a switch, to convert the first voltage to the second voltage at a second level, the second level being higher than the first level, and wherein the second voltage is positive, wherein the switch is closed to connect the input to the transformer after voltage across the first capacitor builds up to a predetermined level, the predetermined level set to hold off the transformer until sufficient energy is stored in the first capacitor,
an output connected to the transformer to output the second voltage; and
a second capacitor connected to the output, wherein capacitance ratio of the first capacitor to the second capacitor is 1000:1 or 6000:1;
an energy storage reservoir coupled to the output of the DC/DC converter to store energy at the second voltage.

7. The device defined in claim 6 wherein the DC/DC converter further comprises a transistor connected to the transformer to switch current through the transformer in order to convert the first voltage to the second voltage.

8. The device defined in claim 7 wherein the transistor comprises a p-channel transistor.

9. The device defined in claim 6 wherein the capacitance ratio of the first capacitor to the second capacitor is 1000:1, and wherein the converter further comprises a p-channel transistor connected to the transformer to switch current through the transformer in order to convert the first voltage to the second voltage.

10. The device defined in claim 6 further comprising a third reservoir coupled to a second reservoir to receive energy transferred from the second reservoir periodically.

11. A sensor device comprising:
an antenna;
an RF communication unit;
a sensor;
a controller; and
an ambient RF energy harvester coupled to the antenna, the RF communication unit, the sensor and the controller to harvest ambient RF power to run the RF communication unit, the sensor and the controller, wherein the RF energy harvester includes a DC/DC converter having
an input for receiving a first voltage at a first level, the first voltage being negative,
a first capacitor connected to the input,
a transformer coupled to the input and the first capacitor, via a switch, to convert the first voltage to the second voltage at a second level, the second level being higher than the first level, and wherein the second voltage is positive, wherein the switch is closed to connect the input to the transformer after voltage across the first capacitor builds up to a predetermined level, the predetermined level set to hold off the transformer until sufficient energy is stored in the first capacitor,
an output connected to the transformer to output the second voltage, and
a second capacitor connected to the output, wherein capacitance ratio of the first capacitor to the second capacitor is 1000:1 or 6000:1.

12. The sensor device defined in claim 11 wherein the capacitance ratio of the first capacitor to the second capacitor is 1000:1, and wherein the converter further comprises a p-channel transistor connected to the transformer to switch current through the transformer in order to convert the first voltage to the second voltage.

* * * * *